(12) United States Patent
Venanzi

(10) Patent No.: US 6,345,466 B1
(45) Date of Patent: Feb. 12, 2002

(54) PORTABLE UPSIDE DOWN GARDEN

(76) Inventor: Frank Venanzi, 415 Grandview Ave., Monongahela, PA (US) 15063

( * ) Notice: Subject to any disclaimer, the term of this patent is extended or adjusted under 35 U.S.C. 154(b) by 0 days.

(21) Appl. No.: 09/535,723

(22) Filed: Mar. 27, 2000

(51) Int. Cl.[7] .................................................. A01G 9/02
(52) U.S. Cl. ........................... 47/66.1; 47/83; 47/41.01; 47/65.5; 47/39
(58) Field of Search ............................. 47/39, 66.1, 83, 47/41.14, 41.12, 66.6, 65.5, 78, 82

(56) References Cited

U.S. PATENT DOCUMENTS

| | | | |
|---|---|---|---|
| 911,149 A | * | 2/1909 | Moore et al. |
| 1,710,878 A | * | 4/1929 | Joseph Kelso |
| 3,137,095 A | * | 6/1964 | Pearson ........................ 47/83 |
| 4,151,680 A | * | 5/1979 | Sena ............................... 47/39 |
| 5,333,409 A | * | 8/1994 | Mendes ......................... 47/67 |
| 5,577,344 A | * | 11/1996 | Zaremba et al. ............... 47/39 |
| 6,094,861 A | * | 8/2000 | Sandman et al. .............. 47/67 |

* cited by examiner

Primary Examiner—Peter M. Poon
Assistant Examiner—Andrea M. Valenti
(74) Attorney, Agent, or Firm—Steptoe & Johnson PLLC

(57) ABSTRACT

A portable gardening system comprised of an assembled center support, large base, small base and grow box with a plurality of holes in the bottom, which can be utilized as needed, for growing multiple types of vegetation upside down out of the bottom of the grow box. In addition, plants and vegetation can be grown upright, as well, out of the open top of the grow box. The unique design of the bottom of the grow box allows the upside down growth of a variety of plants and fully utilizes gardening space that in other devices is not used. Gardening system is easily assembled for use and disassembled for storage.

4 Claims, 4 Drawing Sheets

PORTABLE UPSIDE DOWN GARDEN

BACKGROUND OF THE INVENTION

Due to much interest in gardening, many different systems, both indoor and outdoor, have been developed in the past. These focus, for the most part, on growing vegetation in an area of limited space. However, the currently issued patents tend to also limit the amount and type of vegetation that can be grown and due to the design of some, virtually eliminate the opportunity to grow garden vegetables such as tomatoes and herbs.

U.S. Pat. No. 5,555,676 issued to J. Lund on Sep. 17, 1996, and U.S. Pat. No. 5,381,625 issued to R. Wente on Jan. 17, 1995 detail upright planters with a plurality of holes, in the sides, from which vegetation can grow. These systems can have a built in watering system and optional timer. However, these systems are limited by the fact that minimal vegetation can be grown out the sides, it must be placed within reach of an electric supply, and the vegetation grown could not be fruit bearing, i.e. tomatoes and the like, without the weight of the maturing fruit bending or breaking the limbs and stalks of the plants. The present invention, by growing the plants upside down, eliminates the weight of the fruit pulling the plant down at an unnatural angle in relation to the straightness of a plant's stem. It is hanging upside down and supported by its roots within the grow box. The branches of the vegetation hang straight down and, in this way, the fruit causes no damage to the plant as it matures. This unique growing method allows multiple varieties of plants to be grown in this system at one time.

For soil gardening, there must be sufficient soil area to allow the root structure of the plants to grow and spread without becoming 'root bound'. There are many decorative planters that have been invented which appeal aesthetically such as the 'Natural Appearing Planter' as detailed in U.S. Pat. No. 5,867,938 issued on Feb. 9, 1999 to J. DiLernia. This patent details a planter which is meant to appear as a natural log or tree with openings in to which plants can be introduced. Unfortunately, this type of planting system does not contain sufficient soil space to grow multiple garden plants or varieties. The limitation of soil area requires the gardener to carefully consider the root requirements of a plant before introducing it to this type of planter. The present invention provides a large soil area and by allowing growth upside down, expands the vegetation choices of a limited space gardener.

Hydroponic systems have an appeal to those with limited space also but as U.S. Pat. No. 5,394,647 issued to J. Blackford, Jr. details, space for bushy plants is clearly limited again. Garden plants that obtain any marginal height or width, such as tomatoes or herbs, have their outward and upward growth thwarted by the tops and sides of such closed or partially closed systems. The present invention allows the gardener to grow herbs and other garden plants in a traditionally upright position, out of the top of the grow box, while allowing vining plants to grow out of the bottom in the upside down position.

Similarly, U.S. Pat. No. 4,961,284 issued to B. Williams on Oct. 9, 1990 once again, restricts the lower branch grow and fruit bearing capabilities due to constriction of growth between the slats of the invention. As with U.S. Pat. No. 5,752,341 issued to Goldfarb on May 19, 1998 which details another type of vertical sectional system, also posing restrictions on the number of plants grown and ability to spread out and bear fruit.

Many modular indoor planting systems have been developed such as U.S. Pat. No. 5,996,280 issued to R. Michailiuk on Dec. 7, 1999. This system is expandable, thus making it able to grow more plant life, but requires an amount of floor or counter space that may not be convenient for all indoor gardeners to provide. Obviously, the more plants grown, the more modules must be added and therefore, the more space is required. The present invention grows a multitude of plants and requires minimal space. In addition, it can be moved at will to accommodate all types of environs.

While the tier-type system as detailed in U.S. Pat. No. 5,438,797 issued to G. Lendel on Aug. 8, 1995, does not require an undue amount of floor space, it does require the gardener to carefully choose what can be grown on each level. This system can be increased to contain many tiers but can become unwieldy if heavy fruit bearing plants are grown on or near the top tiers. A collapse of the unit could irrevocably damage the structure and plant life contained therein. The present invention's grow box and bases are carefully aligned and balanced such that the additional weight from soil and plant life makes the structure more secure and stable on its bases, regardless of the plant variety grown.

Further aspects and advantages of this invention will become more evident after consideration is given to the following detailed description of the preferred exemplary embodiments.

SUMMARY OF THE INVENTION

The portable upside down gardening system according to the present invention consists of two cylindrical tubes, hollow or solid, which when joined by a collar, become the assembled center support for the grow box. The grow box contains a center hole and sleeve for insertion of the assembled center support. The opposing end of the assembled center support is inserted into a sleeve attached to the small base, which in turn is attached or molded to the large base, which provides the assembled unit with the necessary stability. The grow box contains a plurality of holes in the bottom which allow vegetation to be grown upside down out of the bottom of the grow box as well as right side up, out of the top in the traditional manner. This unique invention allows gardeners who have limited space, such as patios or balconies, to grow more plants in a smaller area, with the ability to move their 'garden' to a new location at will.

BRIEF DESCRIPTION OF THE ACCOMPANYING DRAWINGS

References will hereinafter be made to the accompanying drawings wherein like reference numerals throughout the various FIGURES denote the like structural elements and wherein.

DETAILED DESCRIPTION OF THE PREFERRED EXEMPLERY EMBODIMENTS

Figure 1:
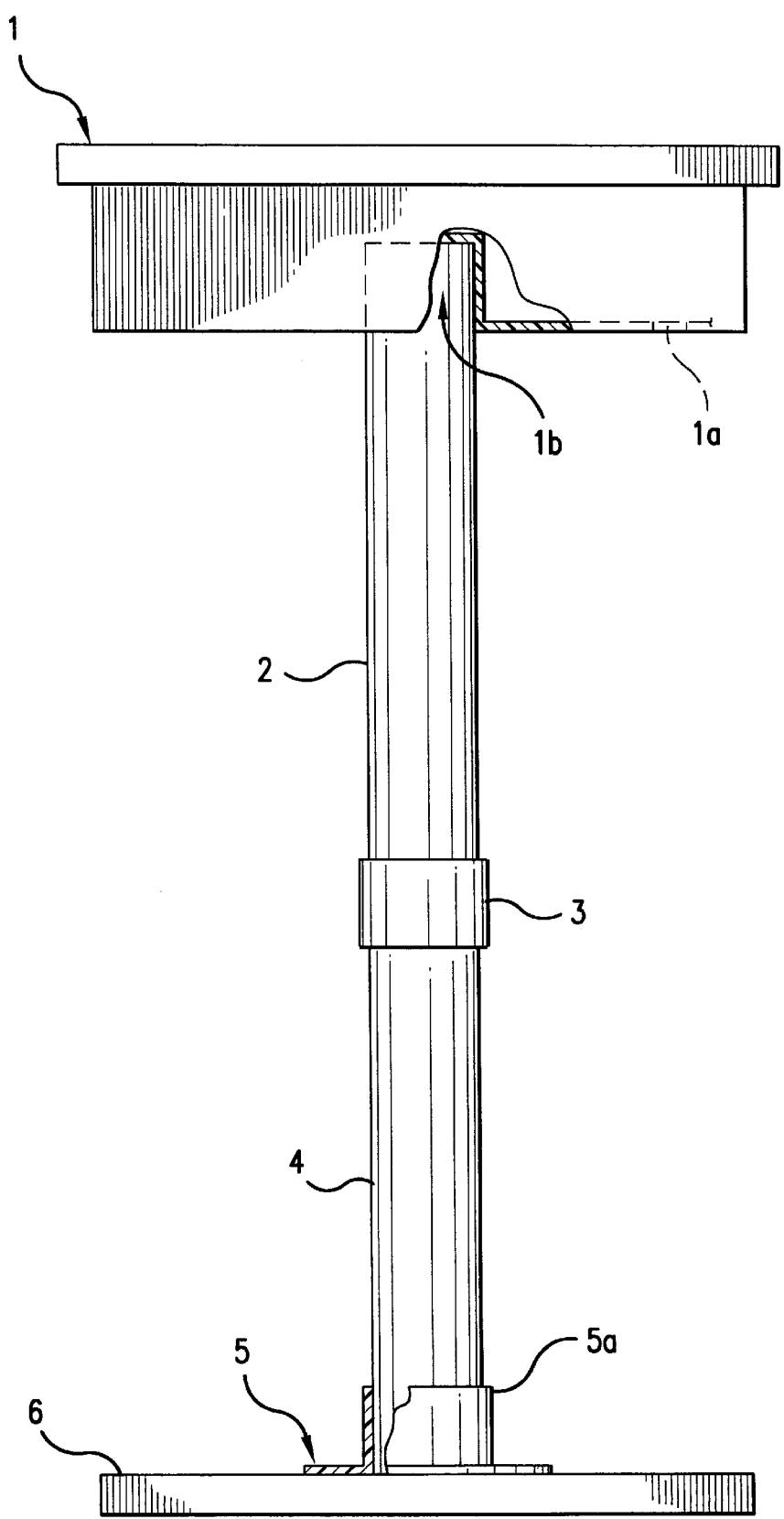
FIG. 1 is a frontal view of the portable upside down garden, assembled, showing the positioning of the assembled center support within predetermined sleeves in the small base and grow box, the large base, to which the small base is attached, and upside down grow holes located in the bottom of the grow box.

The portable upside down garden as shown in FIG. 1 can be readily assembled to be utilized for gardening purposes. As shown, the invention is comprised of the large base (6), to which is molded a small base (5) with a sleeve (5a), which accepts the assembled center support (2)(3)(4). FIG. 1 shows the placement of the grow box (1) in relation to the assembled center support (2)(3)(4) and the means of attaching the grow box (1) to the assembled center support (2)(3)(4) by inserting the assembled center support (2)(3)(4) into the grow box's (1) sleeve (1b). Also, indicated in FIG. 1 are the grow holes (1a) which allow vegetation to be grown upside down. With the ability to grow upside down, as well as right side up in the grow box (1), more plants can be grown in a smaller space.

Figure 2:
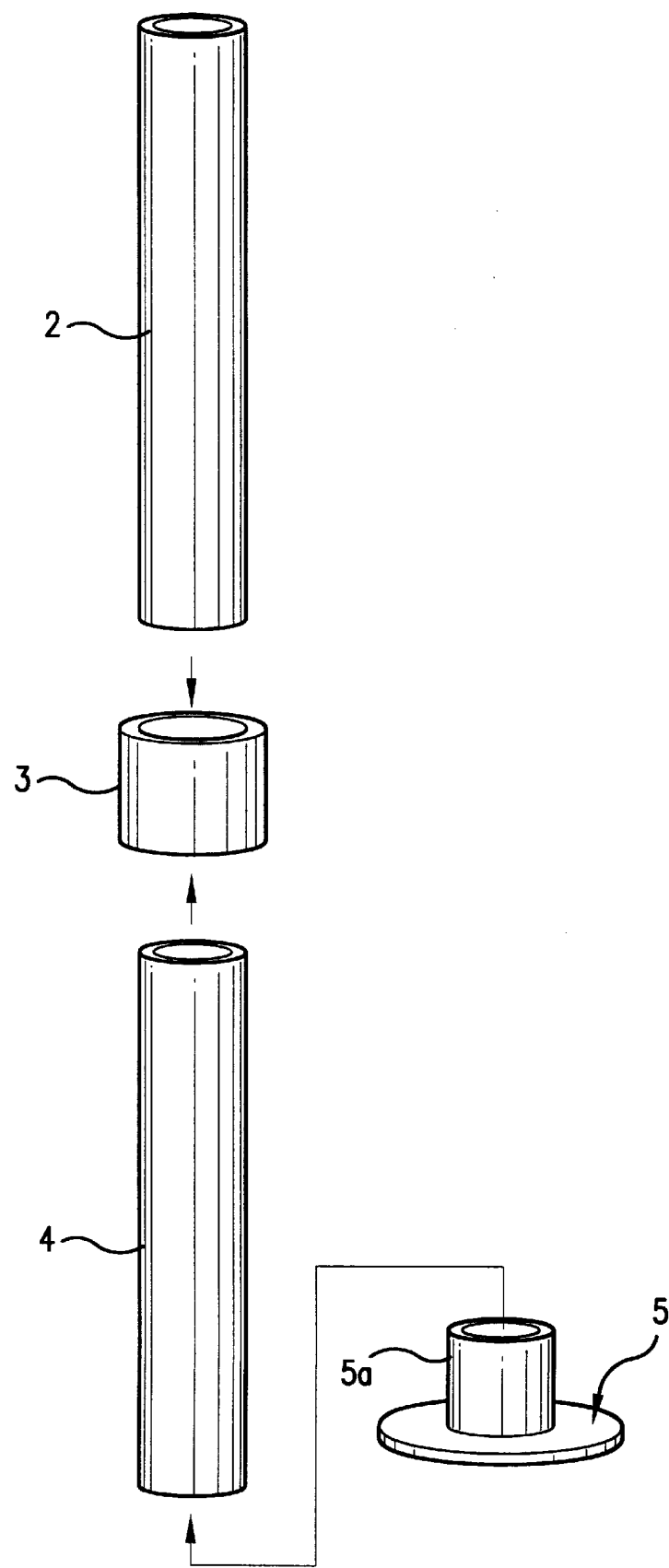
FIG. 2 is a front perspective view showing the cylindrical tubes and collar, which comprise the assembled center support and small base with sleeve into which it inserts.

The assembled center support is shown in FIG. 2 being comprised of a top cylindrical tube (2), bottom cylindrical tube (4) and a collar (3), which joins them together. When assembled, the opposing end of the bottom cylindrical tube (4) is inserted into the small base (5) sleeve (5a), affixed or molded to the small base (5), which in turn is affixed to the large base (6) as shown in FIG. 1. The small base (5) sleeve (5a) should be of sufficient depth to provide stability when the opposing end of the assembled center support (2)(3)(4) is inserted into the grow box (1) sleeve (1b). The opposing end of the top cylindrical tube (2) is likewise inserted into the sleeve (1b) of the grow box (1).

Figure 3:
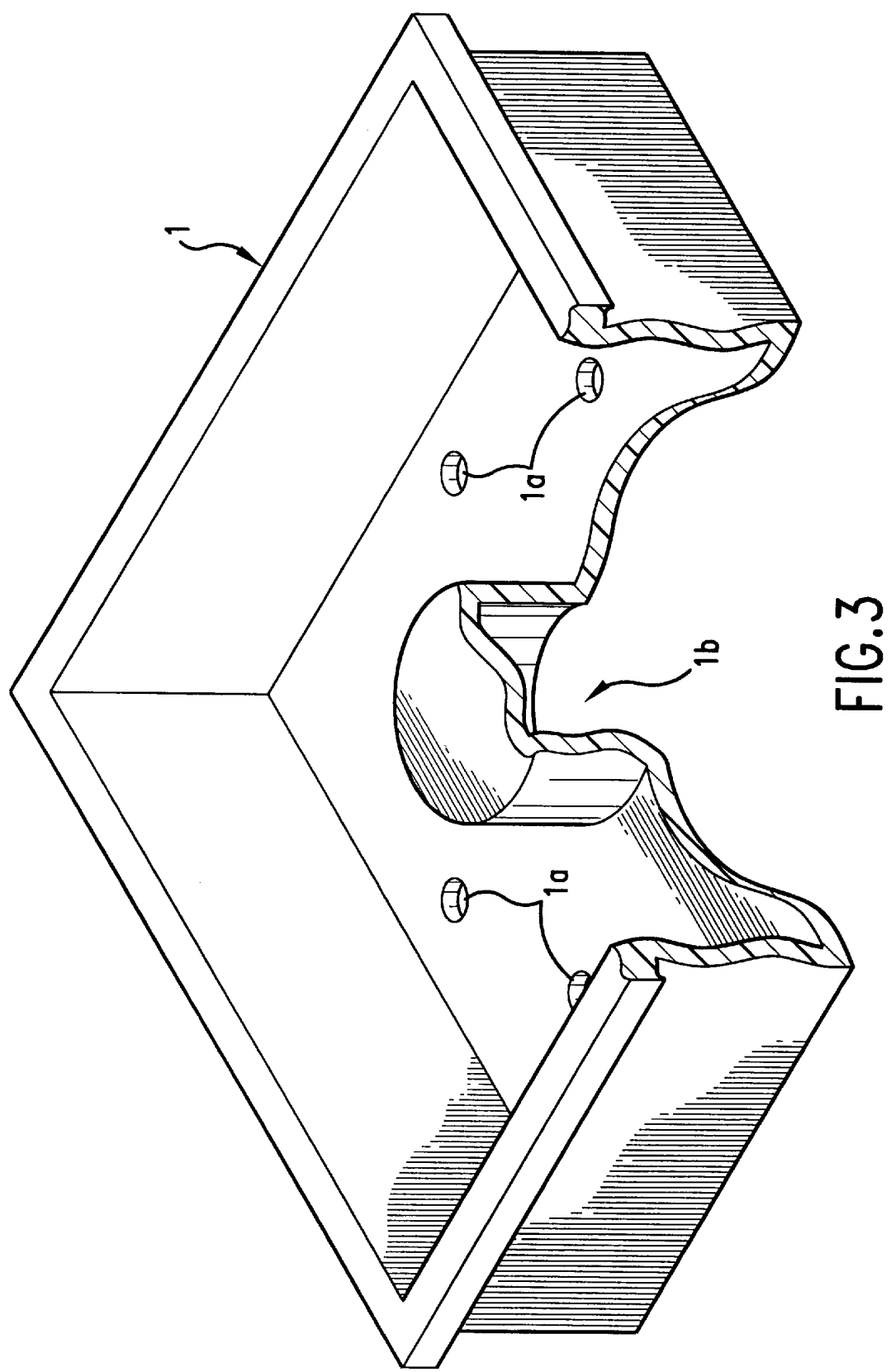
FIG. 3 is a top perspective view showing the grow box, sleeve for insertion of the assembled center support, and the grow holes located in the bottom of the grow box.

FIG. 3 shows the grow box (1) sleeve (1b) which accepts the insertion of the assembled center support (2)(3)(4). The grow box (1) sleeve (1b) is centered in the grow box (1) and of a sufficient depth to be stable upon the large base (6) when the opposing ends of the assembled center support (2)(3)(4) are inserted in both the grow box (1) sleeve (1a) and the small base (5) sleeve (5a) as shown in FIG. 1.

Figure 4:
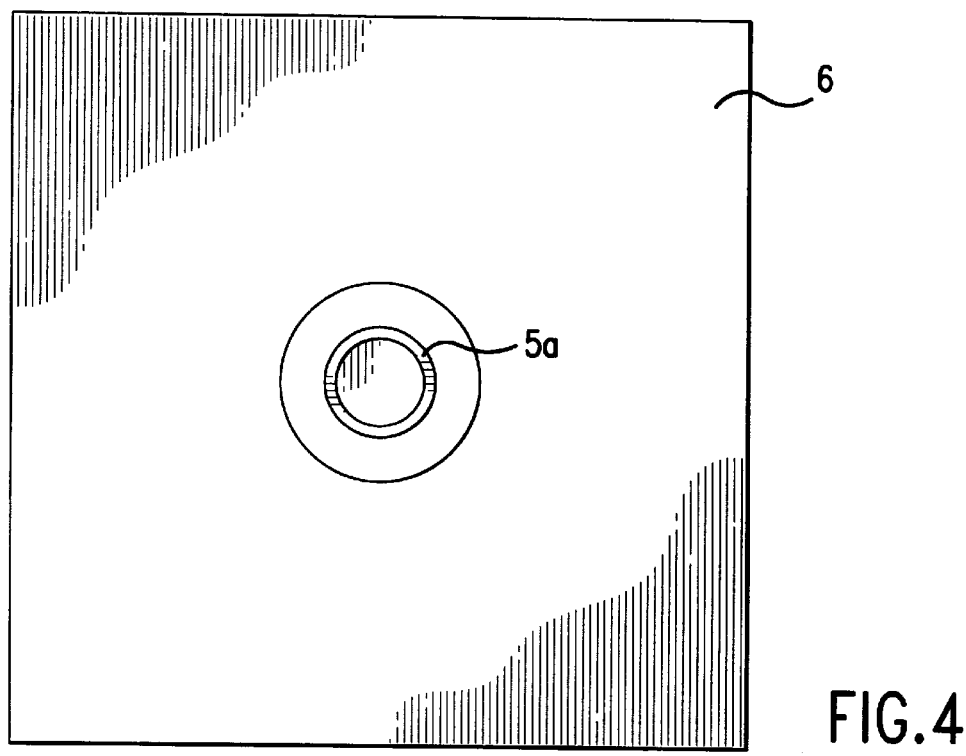
FIG. 4 is a flat view of the base, showing the small base sleeve, which accepts the assembled center support.

As shown in FIG. 4, to the large base (6), is attached or molded, the small base (5) and sleeve (5a) which accepts the opposing end of the assembled center support (2)(3)(4) and provides the assembled unit with the stability necessary to support the weight of the grow box (1) when fully utilized. The small base (5) and the sleeve (5a) can be molded in to the large base (6), for added stability, but can also be affixed by other acceptable methods such as bolts or screws.

Figure 5:
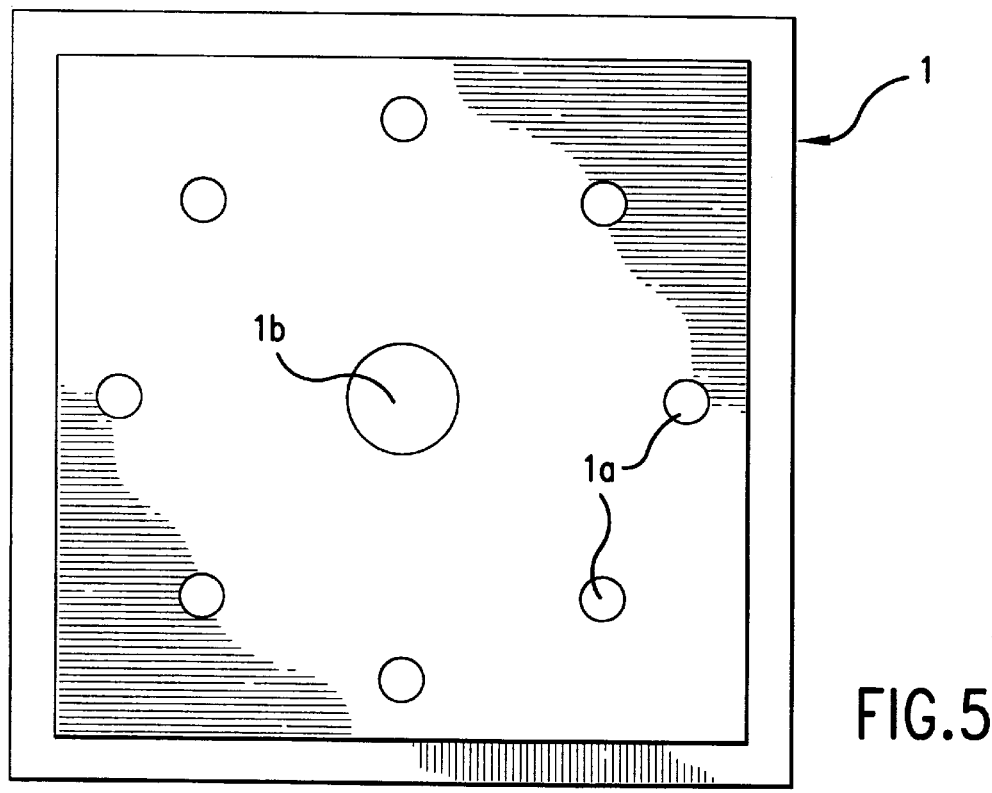
FIG. 5 is a flat view of the grow box showing the sleeve which accepts the assembled center support and the plurality of growing holes which allow vegetation to be grown upside down.

In FIG. 5, the placement of the grow box (1) sleeve (1b) which accepts the assembled center support (2)(3)(4), is shown, attached or molded, in its center location within the grow box (1). The plurality of grow holes (1a), demonstrates the invention's utilization of all available growing space. The grow box (1) is of sufficient depth to provide enough area for soil and nutrients to support the growth of a variety of different plants at the same time.

The present invention has been described with respect to details of certain embodiments thereof. However, it is not intended that such details be limitations upon the scope of the invention. It will be obvious to those skilled in the art that various modifications and/or substitutions may be made without departing from the spirit and scope of the invention as set forth in the following claims.

What is claimed is:

1. A method for growing vegetation, having a root portion and a leaf portion, in a portable upside down gardening system, comprising the steps of:

a. inserting the root portion of a first vegetation in a portable upside down gardening system having a grow box with a plurality of walls, an open top, and a bottom, said bottom having a plurality of holes such that vegetation grows simultaneously out of said plurality of holes in said bottom and out of said open top of said grow box, a base having a top and is of a sufficient size and weight for supporting said grow box, and a means for supporting said grow box in a vertical arrangement above said base, wherein the root portion of said first vegetation is inserted in one said hole in said bottom of said grow box;

b. surrounding the root system in said grow box with soil; and c. planting a second vegetation in said open top of said grow box, such that said first vegetation and said second vegetation grow simultaneously out of said bottom and out of said open top of said grow box.

2. The method according to claim 1, further comprising the step of:

d. filling said grow box with soil.

3. The method according to claim 1, wherein said first vegetation is selected from the group consisting of vegetables and flowers.

4. The method according to claim 1, wherein said second vegetation is selected from the group consisting of vegetables and flowers.

\* \* \* \* \*